(12) United States Patent
Kim et al.

(10) Patent No.: US 9,740,345 B2
(45) Date of Patent: Aug. 22, 2017

(54) TOUCH PANEL

(71) Applicant: Hydis Technologies Co., Ltd., Gyeonggi-do (KR)

(72) Inventors: Hyung Jung Kim, Gyeonggido (KR); Joon Sung An, Seoul (KR); Seong Jung Yun, Gyeonggi-do (KR); Ji Hoon Lee, Seoul (KR)

(73) Assignee: HYDIS TECHNOLOGIES CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/632,527

(22) Filed: Feb. 26, 2015

(65) Prior Publication Data

US 2015/0242035 A1    Aug. 27, 2015

(30) Foreign Application Priority Data

Feb. 26, 2014   (KR) .......................... 10-2014-0022505

(51) Int. Cl.
*G06F 3/041*    (2006.01)
*G06F 3/044*    (2006.01)

(52) U.S. Cl.
CPC .................................... *G06F 3/044* (2013.01)

(58) Field of Classification Search
CPC ......... G06F 3/044; G06F 3/041; G06F 3/0412
USPC ................................................ 345/173–174
See application file for complete search history.

(56) References Cited

U.S. PATENT DOCUMENTS

| | | | | |
|---|---|---|---|---|
| 2014/0320438 | A1* | 10/2014 | Yurlov | ................... G06F 3/044 345/173 |
| 2014/0360856 | A1* | 12/2014 | Mizumoto | .............. G06F 3/044 200/600 |

* cited by examiner

*Primary Examiner* — Towfiq Elahi
(74) *Attorney, Agent, or Firm* — Saliwanchik, Lloyd & Eisenschenk

(57) ABSTRACT

A touch panel may include: a plurality of unit electrode lines disposed in a first axis direction and spaced apart from one another in a second axis direction perpendicular with respect to the first axis direction, wherein in each of a first side line and a second side line forming both sides of each of the unit electrode lines, a first side and a second side are alternately repeated, and a protrusion portion and a recess portion are alternately formed at contact portions at which the first and second sides contact each other depending on an angle at which the first and second sides contact each other, the recess portion being provided with a first groove formed by cutting the unit electrode line in a direction parallel to the first side, and a second groove formed by cutting the unit electrode line in a direction parallel to the second side.

17 Claims, 7 Drawing Sheets

Prior Art

Prior Art

TOUCH PANEL

CROSS-REFERENCE TO RELATED APPLICATION

This application claims the benefit under 35 U.S.C. §119 of Korean Patent Application No. 10-2014-0022505, filed Feb. 26, 2014, which is hereby incorporated by reference in its entirety.

BACKGROUND

Field of Invention

The present invention relates to a touch panel and more particularly, to a touch panel capable of preventing an increase in visibility due to a design of a unit electrode line for preventing a moiré phenomenon.

Description of Related Art

Touch screen panels (TSPs), input devices designed to be attached to or be embedded in display devices such as liquid crystal displays (LCDs), plasma display panels (PDPs), organic light emitting diodes (OLEDs), active matrix organic light emitting diodes (AMOLEDs) or the like, may recognize a touch input generated when an object such as a finger or a touch pen comes into contact with a screen, as an input signal. Recently, touch screen panels may be chiefly mounted in mobile devices such as mobile phones, personal digital assistants (PDAs), portable multimedia players (PMPs) and the like as well as being used over all fields of applications including navigation terminals, netbook computers, laptop computers, digital information devices (DIDs), desktop computers using touch input supporting operating systems, Internet Protocol TV (IPTV), the most advanced fighter aircrafts, tanks, armored vehicles and the like.

Such touch screen panels may have light transmissive properties in order to reduce visibility and be formed of unit electrode lines for sensing a touch signal, using a conductive material. The unit electrode lines may be repeatedly arranged in parallel to each other in order to recognize a position of an input signal on the touch screen panel. As the touch screen panel is laminated together with a diffusion film and a thin film transistor (TFT) array panel, linear patterns may be overlapped with each other to cause a moiré phenomenon due to mutual interference of the patterns.

According to the related art, in order to prevent the occurrence of such a moiré pattern, techniques of configuring unit electrode lines 12 in a zigzag manner by alternately disposing a plurality of electrode lines 12a inclined in opposite directions on a transparent substrate, in a repeated manner, have been used.

That is, the unit electrode lines 12 may be twisted such that they are offset from the linear patterns of a diffusion film and a TFT array panel at a predetermined angle, whereby a moiré phenomenon may be prevented.

In a touch panel 10 according to the related art, the moiré phenomenon may be prevented but since the inclinedly disposed electrode lines 12a and bent portions 12b formed in connection portions of the electrode lines 12a inclinedly disposed in opposite directions, configuring the unit electrode lines 12, are repeatedly arranged in parallel to each other in a horizontal direction, there are defects in which the portions repeatedly arranged in the horizontal direction may be recognized as a line form as illustrated in FIG. 2.

BRIEF SUMMARY

Therefore, an aspect of exemplary embodiments of the present invention may provide a touch panel capable of reducing visibility of unit electrode lines by disposing cutaway grooves inclined in a direction symmetrical to boundary lines within a section in which the boundary lines inclinedly disposed in one direction are repeatedly arranged in a horizontal direction.

In addition, an aspect of exemplary embodiments of the present invention may also provide a touch panel capable of preventing an increase in visibility due to the cutaway grooves by disposing the cutaway grooves and boundary lines in another direction adjacent thereto on the same axial line.

According to an embodiment of the present invention, there is provided a touch panel comprising a plurality of unit electrode lines disposed in a first axis direction and spaced apart from one another in a second axis direction perpendicular with respect to the first axis direction, wherein in each of a first side line and a second side line forming both sides of each of the unit electrode lines, a first side inclined in a first direction from a first axis and a second side inclined in a second direction symmetrical to the first direction with respect to the first axis are alternately repeated, and a protrusion portion and a recess portion are alternately formed at contact portions at which the first and second sides contact each other depending on an angle at which the first and second sides contact each other, the recess portion being provided with a first groove formed by cutting the unit electrode line in a direction parallel to the first side, and a second groove formed by cutting the unit electrode line in a direction parallel to the second side.

The first side line and the second side line may be disposed in parallel to each other, and the recess portion of the first side line and the protrusion portion of the second side line may be disposed on the same second axis and the protrusion portion of the first side line and the recess portion of the second side line may be disposed on the same second axis.

The first side line and the second side line may be symmetrical to each other with respect to the first axis, and the recess portion of the first side line and the recess portion of the second side line may be disposed on the same second axis and the protrusion portion of the first side line and the protrusion portion of the second side line may be disposed on the same second axis.

The first groove and the second groove may be formed in one of the recess portion of the first side line and the recess portion of the second side line disposed on the same second axis.

The recess portion in which the first groove and the second groove are formed may be alternately disposed in the first side line and the second side line in the first axis direction.

The first groove and the second groove respectively formed in the recess portions of the first side line and the second side line and facing each other may be disposed on the same axial line.

In the plurality of unit electrode lines, a pair of unit electrode lines adjacent to each other in the second axis direction may be disposed such that the recess portion of one unit electrode line and the protrusion portion of the other unit electrode line are adjacent to each other in the second axis direction Widths of the first groove and the second groove may be formed to correspond to a width of an interval between the pair of the unit electrode lines adjacent to each other in the second axis direction.

DETAILED DESCRIPTION

Figure 1:
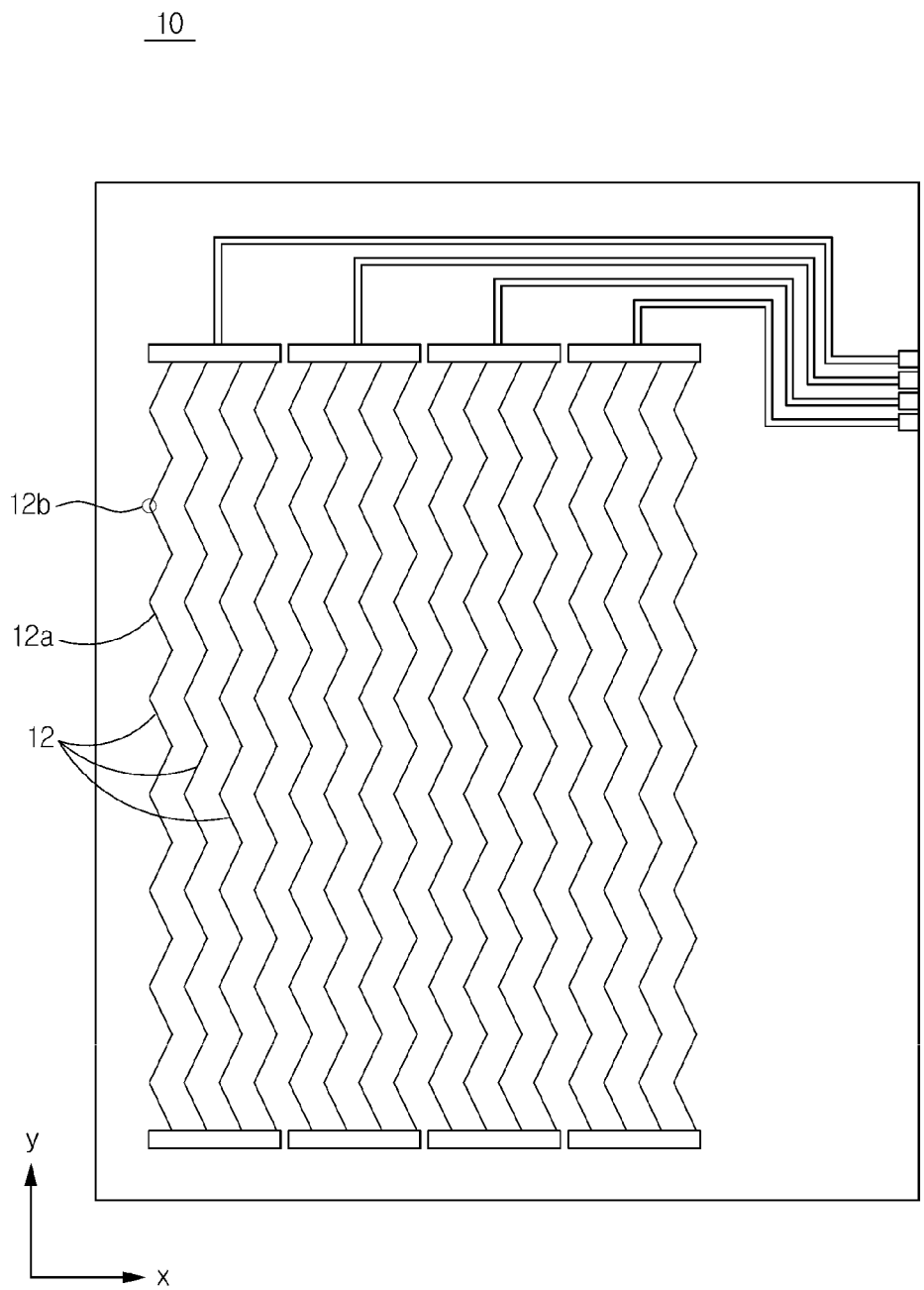
FIG. 1 is a plan view illustrating unit electrode lines of a conventional touch panel.
Figure 2:
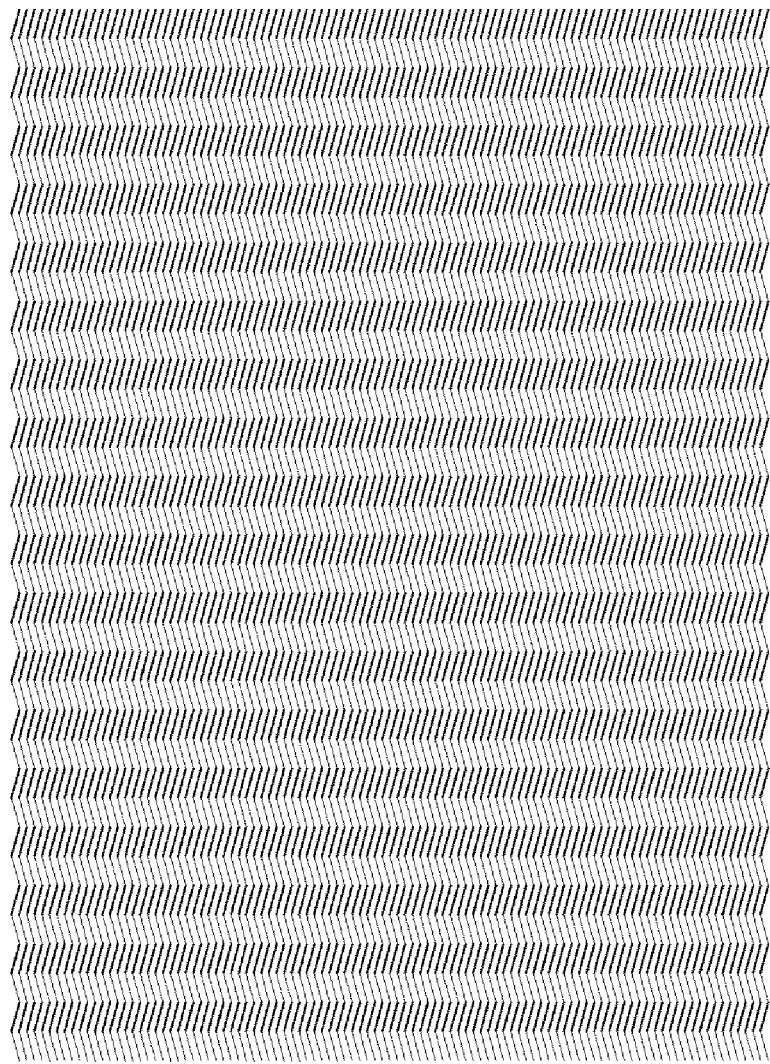
FIG. 2 is a view illustrating visibility defects in the unit electrode lines for preventing a moiré phenomenon, applied to the conventional touch panel.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Prior to the description, in several embodiments, components having the same configurations will be described using the same reference numerals representatively in a first exemplary embodiment, and other components different from those of the first exemplary embodiment will be described in other exemplary embodiments.

Hereinafter, a touch panel according to a first exemplary embodiment of the present invention will be described in detail with reference to the attached drawings.

Figure 3:
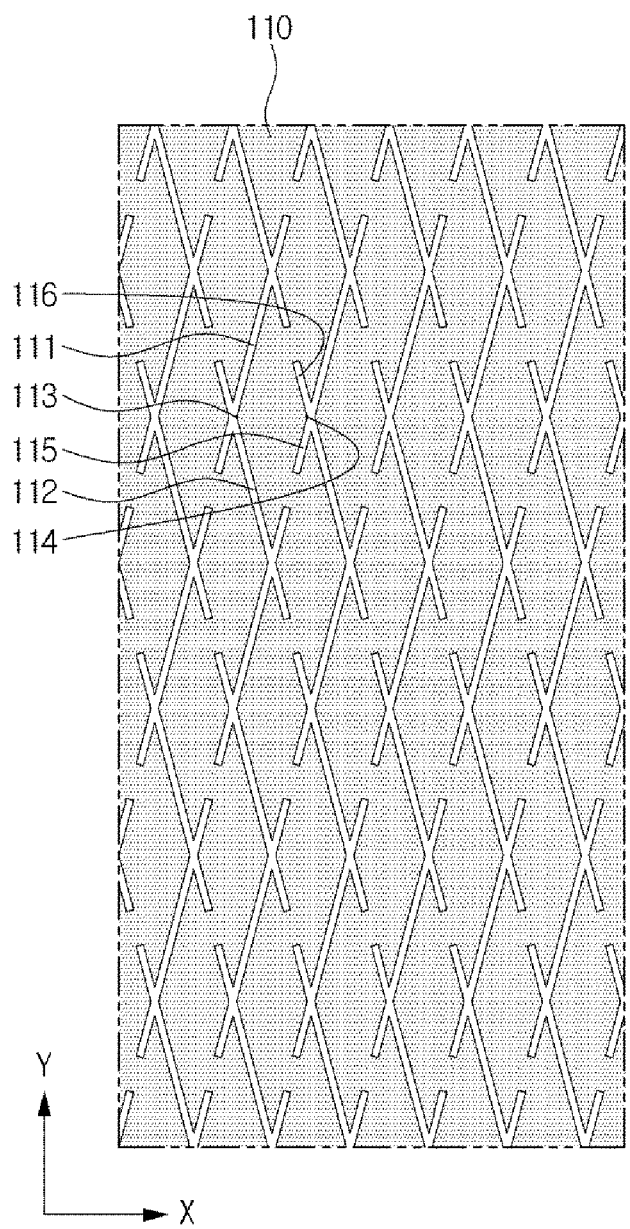
FIG. 3 is a plan view of a touch panel according to a first exemplary embodiment of the present invention.
Figure 4:
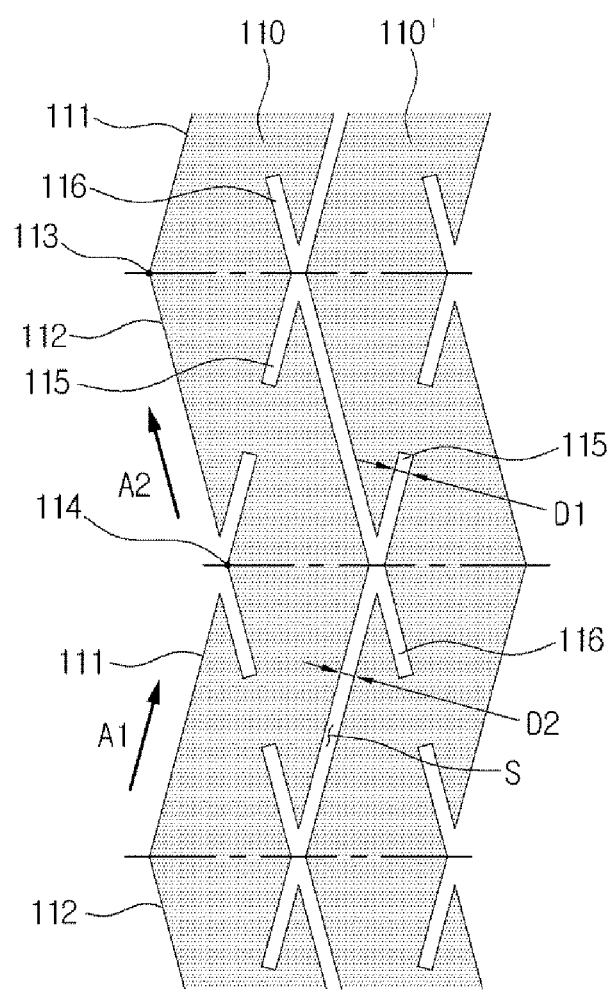
FIGS. 4 and 5 are partially exploded views illustrating main components of the touch panel according to the first exemplary embodiment of the present invention.
Figure 5:
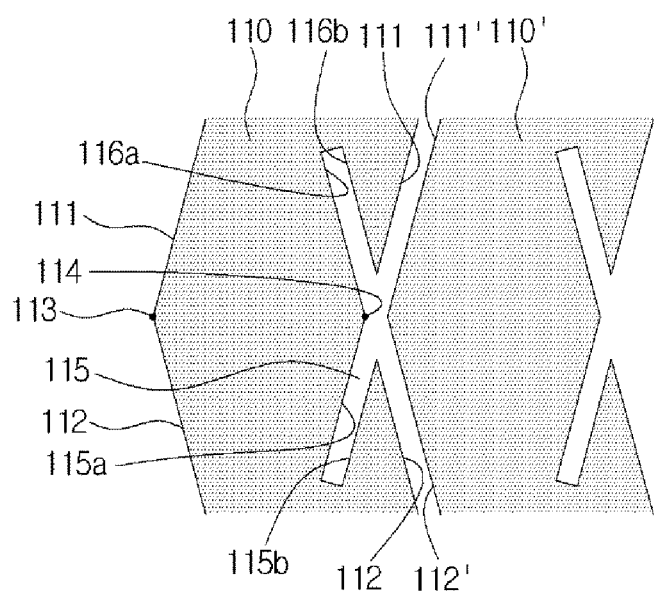

FIG. 3 is a plan view of a touch panel according to a first exemplary embodiment of the present invention. FIGS. 4 and 5 are partially exploded views illustrating main components of the touch panel according to the first exemplary embodiment of the present invention.

As illustrated in the drawings, the touch panel according to the first exemplary embodiment of the present invention may be configured to include a plurality of unit electrode lines 110 disposed in a first axis (Y) direction and spaced apart from one another in a second axis (X) direction perpendicular with respect to the first axis (Y) direction.

The unit electrode lines 110 may be formed of a transparent conductive oxide (TCO) material and be formed by applying a transparent conductive material such as an indium tin oxide (ITO), an indium zinc oxide (IZO), an antimony tin oxide (ATO), a carbon nanotube or the like, onto a transparent substrate.

Specifically, as illustrated in FIG. 4, two side lines of the unit electrode line 110 may be formed in a zigzag manner by alternately repeating a first side 111 laterally inclined at angle of 10 degrees to 20 degrees in a first direction A1 from a first axis (Y) and a second side 112 inclined in a second direction A2 symmetrical to the first direction A1 with respect to the first axis (Y). A protrusion portion 113 and a recess portion 114 may be alternately formed at contact portions at which the first and second sides 111 and 112 contact each other depending on an angle at which the first side 111 and the second side 112 contact each other.

In addition, in the plurality of unit electrode lines 110 spaced apart from one another by predetermined distances in the second axis (X) direction, the recess portion 114 and the protrusion portion 113 of the side lines facing each other may be disposed to face each other. That is, the recess portion 114 and the protrusion portion 113 of the side lines facing each other may be disposed in parallel to each other in the second axis (X) direction.

Here, lengths of the first side 111 and the second side 112 of the unit electrode line 110, tilt angles of the first direction A1 and the second direction A2, and an interval S between the unit electrode lines 110 may be variously adjusted depending on a size of an active region in the transparent substrate or the interval between the unit electrode lines 110 adjacent to each other.

In particular, according to the first exemplary embodiment, the first side 111 of one side line (hereinafter, referred to as "a first side line") of the both side lines of each unit electrode line 110 and the first side 111 of the other side line thereof (hereinafter, referred to as "a second side line") may be disposed in parallel to each other in the second axis (X) direction, and the second side 112 of the first side line and the second side 112 of the second side line may also be disposed in parallel to each other in the second axis (X) direction.

In addition, in the recess portion 114, a first groove 115 formed by cutting the unit electrode line in a direction extended from the first side 111 and a second groove 116 formed by cutting the unit electrode line in a direction extended from the second side 112 may be formed to have predetermined lengths, and the lengths of the first groove 115 and the second groove 116 may be preferably formed within a range in which a current flow is not interrupted.

The first groove 115 and the second groove 116 may provide visual effects in which the first side 111 and the second side 112 adjacent to the first groove 115 and the second groove 116 may appear to cross each other at the recess portion 114 to be extended.

In a state in which the plurality of unit electrode lines 110 are disposed in the second axis (X) direction, since the first sides 111 disposed to be parallel to each other in the both side lines of the unit electrode lines 110 may be repeatedly arranged in a line in the second axis (X) direction and similarly, the second sides 112 may also be repeatedly arranged in a line in the second axis (X) direction, the first sides 111 inclinedly disposed in the first direction A1 to be parallel to each other and the second sides 112 inclinedly disposed in the second direction A2 to be parallel to each other may be recognized as line forms in the second axis (X) direction.

However, in the exemplary embodiment, since the second groove 116 inclined in the second direction A2 may be disposed in a section in which the first sides 111 are repeatedly arranged, the visibility of the section in which the first sides 111 are repeatedly arranged may be degraded. In a similar manner, since the first groove 115 inclined in the first direction A1 may be disposed in a section in which the second sides 112 are repeatedly arranged, the visibility of the section in which the second sides 112 are repeatedly arranged may also be degraded.

In addition, the first groove 115 and the second groove 116 respectively formed in the recess portions 114 of the both side lines of the unit electrode lines 110 and facing each other may be disposed on the same axial line, and widths D1 of the first groove 115 and the second groove 116 formed in the recess portion 114 of the unit electrode line 110 may be formed to correspond to a width D2 of the interval S between the pair of unit electrode lines 110 adjacent to each other in the second axis (X) direction.

That is, as illustrated in FIG. 5, in both sides 115a and 115b configuring the first groove 115 of the recess portion 114, one side 115a connected to the recess portion 114 and the first side 111 connected to the recess portion 114 may be disposed on the same axial line, and the other side 115b connected to the second side 112 and a first side 111' of a unit electrode line 110' adjacent to the unit electrode line 110 may be disposed on the same axial line, such that the width D1 of the first groove 115 may be identical to that of the interval S between a pair of unit electrode lines 110 and 110' adjacent to each other.

In addition, in both sides 116a and 116b configuring the second groove 116 of the recess portion 114, one side 116a connected to the recess portion 114 and the second side 112 connected to the recess portion 114 may be disposed on the same axial line, and the other side 116b connected to the first side 111 and a second side 112' of the unit electrode line 110' adjacent to the unit electrode line 110 may be disposed on the same axial line, such that the width D1 of the second groove 116 may also be identical to that of the interval S between the pair of unit electrode lines 110 and 110' adjacent to each other.

As described above, the both sides 115a and 115b of the first groove 115 may be disposed on the same axial line as two facing first sides 111 and 111' of a pair of unit electrode lines 110 and 110' adjacent to each other. The both sides 116a and 116b of the second groove 116 may be disposed on the same axial line as two facing second sides 112 and 112' of the pair of unit electrode lines 110 and 110' adjacent to each other. Thus, the first groove 115 and the second groove 116 may provide visual effects in which the first sides 111 and 111' and the second sides 112 and 112' circumjacent to the grooves are extended in linear directions, whereby an increase in visibility in a formation portion of the first groove 115 and the second groove 116, caused by the visual division of the first groove 115 and the second groove 116 from the first side 111 and the second side 112 circumjacent to the grooves may be prevented.

Then, a touch panel according to a second exemplary embodiment of the present invention will be described.

Figure 6:
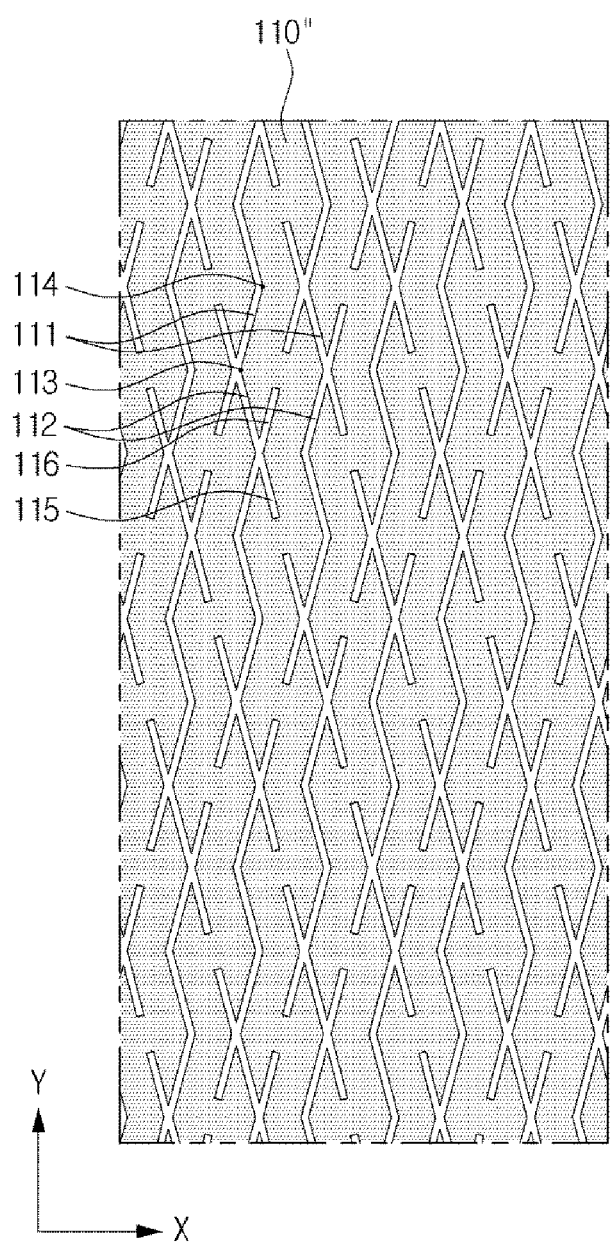
FIG. 6 is a plan view of a touch panel according to a second exemplary embodiment of the present invention.
Figure 7:
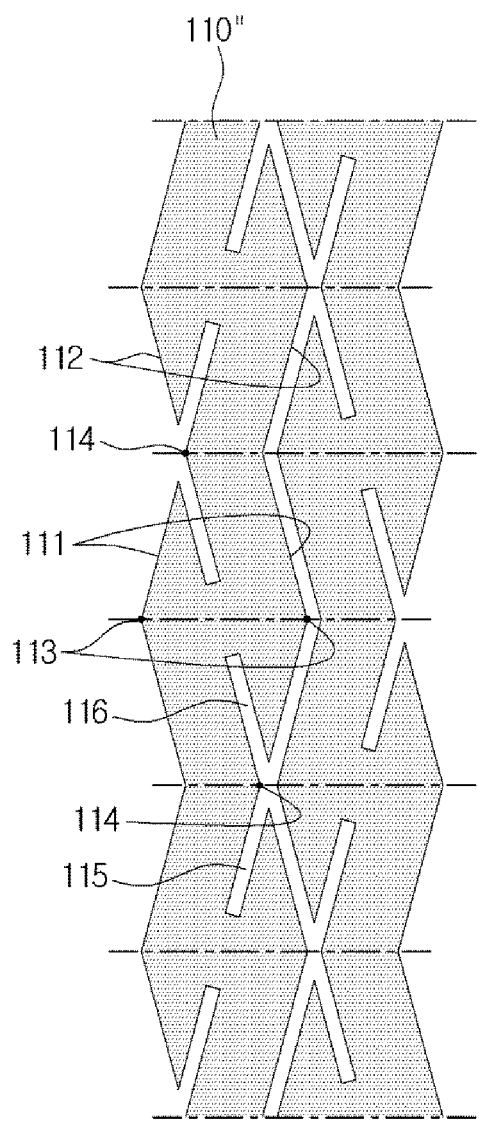
FIG. 7 is a partially exploded view illustrating main components of the touch panel according to the second exemplary embodiment of the present invention.

FIG. 6 is a plan view of the touch panel according to the second exemplary embodiment of the present invention. FIG. 7 is a partially exploded view illustrating main components of the touch panel according to the second exemplary embodiment of the present invention.

The touch panel according to the second exemplary embodiment of the present invention as illustrated in FIGS. 6 and 7 may be different from that of the first exemplary embodiment in that both side lines of unit electrode lines 110" are formed to be symmetrical to each other.

Specifically, a first side line and a second side line, the both side lines of each unit electrode line 110" may be symmetrical to each other with respect to the first axis (Y). Thus, the recess portion 114 of the first side line and the recess portion of the second side line may be disposed in parallel to each other on the same second (X) axis, and the protrusion portion 113 of the first side line and the protrusion portion of the second side line may also be disposed in parallel to each other on the same second (X) axis.

In a case in which the unit electrode line 110" is configured as above, it may be possible to prevent the first side 111 and the second side 112 from being repeatedly arranged in the second (X) axis direction, whereby visibility may be reduced.

However, in the unit electrode line 110" having such a shape, since a central portion between the first side line and the second side line, the both side lines thereof may be linearly disposed in the first axis (Y) direction, a moiré phenomenon may occur when the unit electrode line is combined with a first axis (Y) directional line component of a diffusion sheet or an array substrate laminated and configured together with the touch panel.

However, in the second exemplary embodiment, since the first groove 115 and the second groove 116 formed in the recess portions 114 of the side lines are disposed in the central portion of the unit electrode line 110", a moiré phenomenon due to the unit electrode line 110" may be prevented.

In particular, since the first groove 115 and the second groove 116 are only formed in one recess portion 114 of two recess portions 114 facing each other, and the recess portions 114 provided with the first groove 115 and the second groove 116 are alternately disposed in the both side lines in the first axis (Y) direction, it may be possible to prevent the first groove 115 and the second groove 116 from being disposed in a line in the first axis (Y) direction to thereby be recognized.

As set forth above, according to exemplary embodiments of the present invention, a touch panel capable of reducing visibility of unit electrode lines by disposing cut-away grooves inclined in a direction symmetrical to boundary lines within a section in which the boundary lines inclinedly disposed in one direction are repeatedly arranged in a horizontal direction may be provided.

In addition, a touch panel capable of preventing an increase in visibility due to the cut-away grooves by disposing the cut-away grooves and boundary lines in another direction adjacent thereto on the same axial line may be provided.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A touch panel comprising a plurality of unit electrode lines, each of the plurality of unit electrode lines being disposed in a direction of a first axis and the plurality of unit electrode lines being spaced apart from one another in a direction of a second axis perpendicular to the direction of the first axis;
   wherein in each of a first side line and a second side line forming both sides of each of the unit electrode lines, a first side inclined in a first direction from the first axis and a second side inclined in a second direction from the first axis are alternately repeated along the first axis, the first direction is symmetrical to the second direction with respect to the first axis, and a protrusion portion and a recess portion are alternately formed at contact portions at which the first and second sides contact each other depending on an angle at which the first and second sides contact each other;
   the recess portion being provided with a first groove formed by cutting the unit electrode line in a direction parallel to the first side, and a second groove formed by cutting the unit electrode line in a direction parallel to the second side;

the first groove and the second groove on the first side line being physically separated from the first groove and the second groove on the second side line; and the unit electrodes being wider than the spaces between the unit electrodes.

2. The touch panel according to claim 1, wherein the first side line and the second side line are disposed in parallel to each other, and the recess portion of the first side line and the protrusion portion of the second side line are disposed on the same second axis and the protrusion portion of the first side line and the recess portion of the second side line are disposed on the same second axis.

3. The touch panel according to claim 1, wherein the first side line and the second side line are symmetrical to each other with respect to the first axis, and the recess portion of the first side line and the recess portion of the second side line are disposed on the same second axis and the protrusion portion of the first side line and the protrusion portion of the second side line are disposed on the same second axis.

4. The touch panel according to claim 3, wherein the first groove and the second groove are formed in one of the recess portion of the first side line and the recess portion of the second side line disposed on the same second axis.

5. The touch panel according to claim 4, wherein the recess portion in which the first groove and the second groove are formed is alternately disposed in the first side line and the second side line in the direction of the first axis.

6. The touch panel according to claim 2, wherein the first groove and the second groove respectively formed in the recess portions of the first side line and the second side line and facing each other are disposed on the same axial line.

7. The touch panel according to claim 6, wherein in the plurality of unit electrode lines, a pair of unit electrode lines adjacent to each other in the direction of the second axis are disposed such that the recess portion of one unit electrode line and the protrusion portion of the other unit electrode line are adjacent to each other in the direction of the second axis.

8. The touch panel according to claim 7, wherein widths of the first groove and the second groove are formed to correspond to a width of an interval between the pair of the unit electrode lines adjacent to each other in the direction of the second axis.

9. The touch panel according to claim 3, wherein the first groove and the second groove respectively formed in the recess portions of the first side line and the second side line and facing each other are disposed on the same axial line.

10. The touch panel according to claim 9, wherein in the plurality of unit electrode lines, a pair of unit electrode lines adjacent to each other in the direction of the second axis are disposed such that the recess portion of one unit electrode line and the protrusion portion of the other unit electrode line are adjacent to each other in the direction of the second axis.

11. The touch panel according to claim 10, wherein widths of the first groove and the second groove are formed to correspond to a width of an interval between the pair of the unit electrode lines adjacent to each other in the direction of the second axis.

12. The touch panel according to claim 4, wherein the first groove and the second groove respectively formed in the recess portions of the first side line and the second side line and facing each other are disposed on the same axial line.

13. The touch panel according to claim 12, wherein in the plurality of unit electrode lines, a pair of unit electrode lines adjacent to each other in the direction of the second axis are disposed such that the recess portion of one unit electrode line and the protrusion portion of the other unit electrode line are adjacent to each other in the direction of the second axis.

14. The touch panel according to claim 13, wherein widths of the first groove and the second groove are formed to correspond to a width of an interval between the pair of the unit electrode lines adjacent to each other in the direction of the second axis.

15. The touch panel according to claim 5, wherein the first groove and the second groove respectively formed in the recess portions of the first side line and the second side line and facing each other are disposed on the same axial line.

16. The touch panel according to claim 15, wherein in the plurality of unit electrode lines, a pair of unit electrode lines adjacent to each other in the direction of the second axis are disposed such that the recess portion of one unit electrode line and the protrusion portion of the other unit electrode line are adjacent to each other in the direction of the second axis.

17. The touch panel according to claim 16, wherein widths of the first groove and the second groove are formed to correspond to a width of an interval between the pair of the unit electrode lines adjacent to each other in the direction of the second axis.

* * * * *